United States Patent
Kim et al.

(10) Patent No.: US 10,395,132 B2
(45) Date of Patent: Aug. 27, 2019

(54) ELECTRONIC DEVICE FOR EXTRACTING DISTANCE OF OBJECT AND DISPLAYING INFORMATION AND METHOD THEREOF

(71) Applicant: Samsung Electronics Co., Ltd., Gyeonggi-do (KR)

(72) Inventors: Moon-Soo Kim, Seoul (KR); Jin-Hong Jeong, Gyeonggi-do (KR); Hwa-Yong Kang, Gyeonggi-do (KR); Young-Kwon Yoon, Seoul (KR); Tae-Ho Kim, Chungcheongbuk-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 14/311,017

(22) Filed: Jun. 20, 2014

(65) Prior Publication Data

US 2014/0376779 A1 Dec. 25, 2014

(30) Foreign Application Priority Data

Jun. 21, 2013 (KR) .................. 10-2013-0071361

(51) Int. Cl.
| | |
|---|---|
| *G06K 9/34* | (2006.01) |
| *G09G 5/00* | (2006.01) |
| *G03B 17/18* | (2006.01) |
| *H04N 21/44* | (2011.01) |
| *H04N 21/443* | (2011.01) |
| *H04N 21/4223* | (2011.01) |

(52) U.S. Cl.
CPC ............ *G06K 9/348* (2013.01); *G03B 17/18* (2013.01); *G09G 5/00* (2013.01); *H04N 21/4223* (2013.01); *H04N 21/44008* (2013.01); *H04N 21/4438* (2013.01); *G09G 2340/0464* (2013.01); *G09G 2340/12* (2013.01); *G09G 2340/14* (2013.01)

(58) Field of Classification Search
None
See application file for complete search history.

(56) References Cited

U.S. PATENT DOCUMENTS

| | | | | |
|---|---|---|---|---|
| 5,815,158 | A * | 9/1998 | Lubachevsky | .......... G06T 15/00 |
| | | | | 345/427 |
| 8,587,702 | B2 * | 11/2013 | Hara | .................. H04N 5/23212 |
| | | | | 348/246 |
| 2002/0051575 | A1 * | 5/2002 | Myers | .................. G06K 9/3258 |
| | | | | 382/202 |
| 2005/0185086 | A1 * | 8/2005 | Onozawa | ........... H04N 5/23212 |
| | | | | 348/349 |

(Continued)

FOREIGN PATENT DOCUMENTS

| | | |
|---|---|---|
| JP | 2011185664 A * | 9/2011 |
| KR | 10-2012-0079189 | 7/2012 |
| KR | 10-2012-0119920 | 10/2012 |

*Primary Examiner* — Jiangeng Sun

(57) ABSTRACT

An electronic device for extracting a distance of an object and displaying information and a method thereof. The method includes extracting relative distance information of at least two or more objects using a pixel distribution diagram sensed using a sensor of the electronic device and displaying information on an object with a relative value in which the extracted relative distance information and object analysis information are reflected.

18 Claims, 9 Drawing Sheets

(56) References Cited

U.S. PATENT DOCUMENTS

2011/0043869 A1* 2/2011 Okajo ............... G06K 9/00456
358/474
2014/0263969 A1* 9/2014 Mayer ............... H04N 5/37206
250/208.1

* cited by examiner

ELECTRONIC DEVICE FOR EXTRACTING DISTANCE OF OBJECT AND DISPLAYING INFORMATION AND METHOD THEREOF

PRIORITY

The present application is related to and claims the benefit under 35 U.S.C. § 119(a) of a Korean patent application filed in the Korean Intellectual Property Office on Jun. 21, 2013 and assigned Serial No. 10-2013-0071361, the entire disclosure of which is hereby incorporated by reference.

TECHNICAL FIELD

The present disclosure relates to an electronic device for extracting a distance of an object and displaying information and a method thereof.

BACKGROUND

As a function of a camera module installed in each of electronic device has been developed, the camera module has provided high image pixels, various editing function, etc. to improve convenience of a user.

However, in order to perform a Picture In Picture (PIP) function of the above-described editing functions, because a conventional electronic device must continuously perform an Auto Focus (AF) function of electronic device's lens to detect an image of a main object among images of a plurality of objects, there is a problem in that current consumption quantity is increased. Also, when the conventional electronic device detects the main object on an image of a plurality of objects, a focused region is a part of the image of the plurality of objects, there is a problem in that other objects except for the main object are concealed by contents to be inserted.

Therefore, it is urgent to provide an apparatus and method for accurately detecting an image of the main object among a plurality of objects to perform the PIP function among the various editing functions of the electronic device and preventing images of other objects except for the main object from being concealed by contents to be inserted.

SUMMARY

To address the above-discussed deficiencies, it is a primary object to provide an apparatus and method for improving convenience of a user because an image of a main object is not concealed by extracting depth information of each of a plurality of objects, which is input to a top phase difference sensor, and displaying information on an object with the furthermost relative depth information.

Another aspect of the present disclosure is to provide an apparatus and method for fulfilling various needs of a user because images of a main object and a sub-object are not concealed by displaying information on an object with a little amount of analyzed information using object analysis information such as edge distribution information, color distribution information, contrast distribution information, and text distribution information of an object.

In accordance with one aspect of the present disclosure, an operation method of an electronic device is provided. The operation method includes extracting relative distance information of at least two or more objects using a pixel distribution diagram sensed in a sensor of the electronic device and displaying information on an object with a small relative value to which the extracted relative distance information and object analysis information are reflected.

In accordance with another aspect of the present disclosure, an electronic device is provided. The electronic device includes a processor module for extracting relative distance information of at least two or more objects using a pixel distribution diagram sensed using a sensor and a touch screen for displaying information on an object with a small relative value to which the extracted relative distance information and object analysis information are reflected.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description, well-known functions or constructions are not described in detail since they would obscure the disclosure in unnecessary detail.

Figure 1:
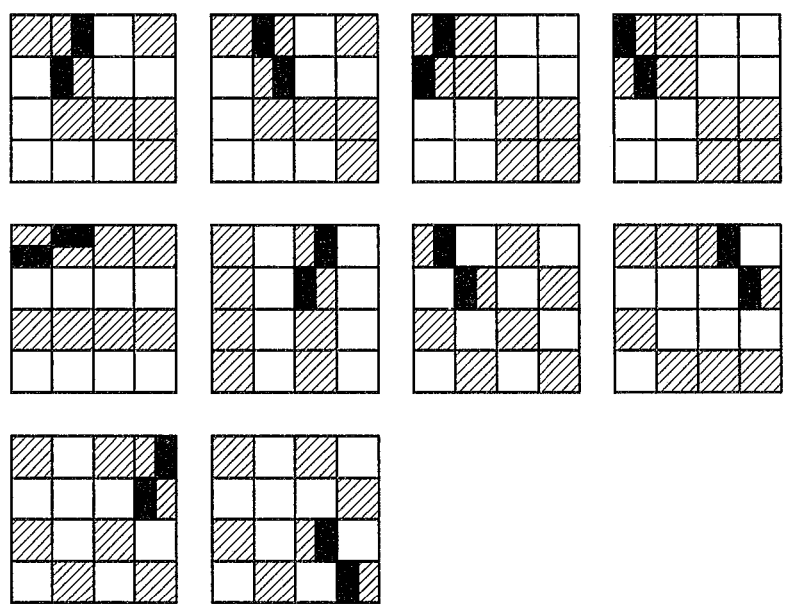
FIG. 1 illustrates phase difference focus detection pixels according to one embodiment of the present disclosure.

FIG. 1 illustrates phase difference focus detection pixels according to one embodiment of the present disclosure.

First of all, an electronic device according to one embodiment of the present disclosure may include a top phase difference sensor. Herein, the top phase difference sensor may be defined as a sensor for extracting relative distance information of each of at least two or more objects using a pixel distribution diagram sensed in at least a pair of phase difference focus detection pixels. In more detail, the electronic device may relative distance information of each of at least two or more objects using the electronic device's top phase difference sensor. For example, sensing three objects, the electronic device may detect the nearest object, the furthermost object, and an object which is in a middle position therefrom, among the sensed three objects using the top phase difference sensor.

The electronic device according to one embodiment of the present disclosure may extract relative distance information of objects which are spaced apart from an object among sensed objects, using a plurality of phase difference focus detection pixels. In more detail, a pair of phase difference focus detection pixels of the electronic device may be disposed in mutually adjacent positions.

For example, as shown in FIG. 1, a first phase difference focus detection pixel displayed in black may be disposed in a position which is adjacent to a second phase difference focus detection pixel which is another phase difference focus detection pixel. In more detail, a shielding film which is disposed on the first phase difference focus detection pixel between a pair of phase difference focus detection pixels may be disposed on a position which is not overlapped with the second phase difference focus detection pixel. That is, the first phase difference focus detection pixel may detect light passing to one end of an exit pupil of a micro lens. The second phase difference focus detection pixel may detect light passing to the other end of the micro lens.

Accordingly, as described above, the electronic device may accurately extract relative distance information of a plurality of objects which are spaced apart from an object using plural pairs of phase difference focus detection pixels. That is, the electronic device may extract relative distance information according to whether another object is relatively positioned in front of an object or in back of the object based on a currently focused object, using the top phase difference sensor.

Figure 2A:
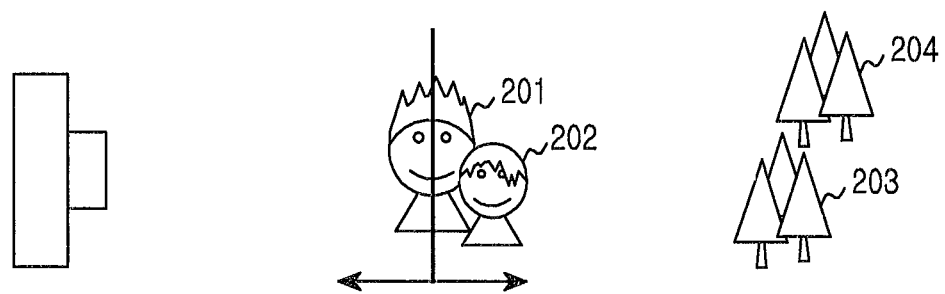
FIGS. 2A and 2B illustrate a process of extracting relative distance information of a plurality of objects in an electronic device according to one embodiment of the present disclosure.
Figure 2B:
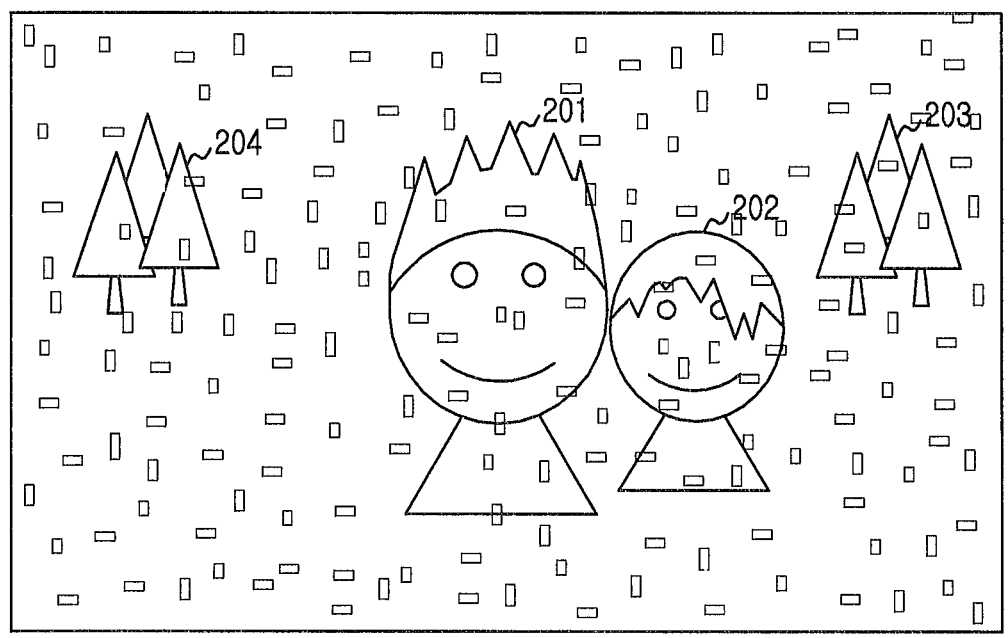

FIGS. 2A and 2B illustrate a process of extracting relative distance information of a plurality of objects in an electronic device according to one embodiment of the present disclosure.

Hereinafter, as shown in FIG. 2A, it is assumed that the electronic device executes a camera application and photographs a plurality of objects 201 to 204 which are in front of the electronic device's lens. Also, it is assumed that the electronic device display information including certain contents on an object with the furthermost relative distance, using the plurality of photographed objects 201 to 204.

First of all, in the above-described assumption, the electronic device may extract relative distance information of the plurality of objects 201 to 204, using a top phase difference sensor installed therein. In more detail, the electronic device may extract relative distance information of the plurality of objects 201 to 204 therefrom, using a pixel distribution diagram sensed in the top phase difference sensor.

For example, the electronic device may extract distance information about the object 202 just in back of the reference object 201, the object 203 which is in the next position, and the object 204 which is in the furthermost position, based on the reference object 201 which is in the nearest position therefrom. That is, the electronic device may extract relative distance information from the object 201 with the nearest relative distance information and the object 204 with the furthermost relative distance information.

That is, as shown in FIG. 2B, the electronic device may recognize the object 201 which is in the nearest position therefrom as a main object and recognize the other objects 202 to 204 as sub-objects, among the objects 201 to 204 included in a photographed image.

Therefore, the electronic device according to one embodiment of the present disclosure may recognize the objects 202 to 204, each of them having a distant relative distance, as well as the object 201 with a near relative distance and insert and display information including certain con tents such that all the objects 201 to 204 are not concealed.

Figure 3:
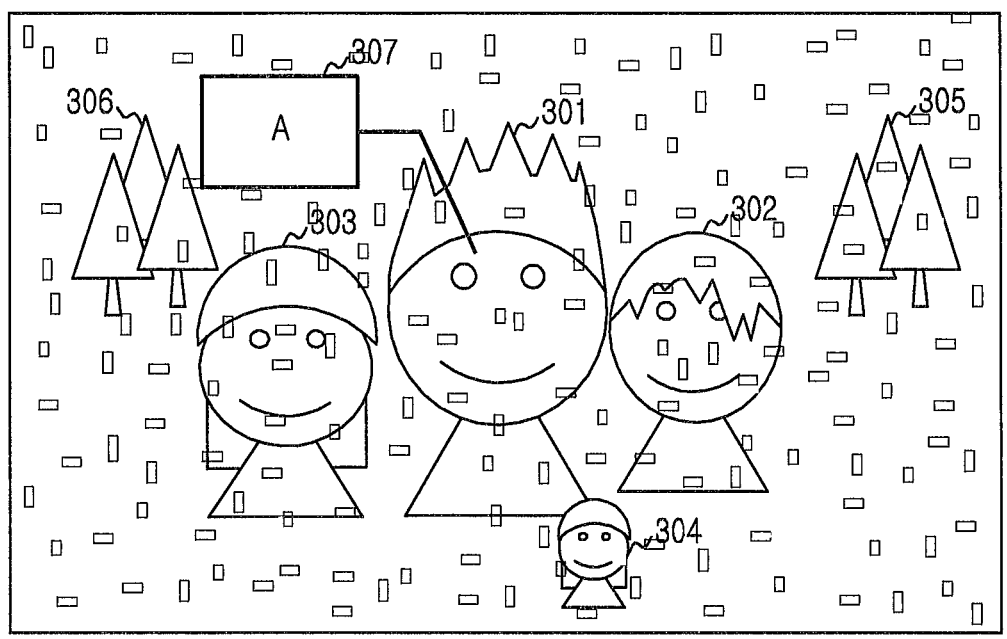
FIG. 3 illustrates a process of inserting information including contents into an image using extracted relative distance information of an object in an electronic device according to one embodiment of the present disclosure.

FIG. 3 illustrates a process of inserting information including contents into an image using extracted relative distance information of an object in an electronic device according to one embodiment of the present disclosure.

Hereinafter, it is assumed that the electronic device executes a camera application, extracts relative distance information of a plurality of objects 301 to 306, and simultaneously photographs an image including the plurality of objects 301 to 306. Also, as a result of extracting the relative distance information of the plurality of objects 301 to 306, the object 301 in which an image of a person is sensed is recognized as an object which is in the nearest position therefrom and the object 306 of a tree in the background is recognized as an object which is in the furthermost position.

In the above-described assumption, the electronic device may insert and display information including certain contents into the photographed image, such that the sub-objects 302 to 306 as well as the main object 301 are not concealed. In more detail, the electronic device may display information on an object with a distant relative distance using the extracted relative distance information. Preferably, the electronic device may insert and display information including certain contents into the photographed image such that the object 306 with the furthermost relative distance among the recognized relative distance information is not concealed.

Herein, the information including the contents may be information such as video information, text information, image information, character information, and landscape information for expressing the objects included in the image. Also, although the information including the contents is not information for expressing the object itself, it may be information such as video information, text information, image information, character information, and landscape information for inserting a memo, etc. That is, the information including the contents may be contents used in a PIP mode.

For example, as shown in FIG. 3, the electronic device may insert and display contents 307 of a text type into the photographed image, such that the object 306 with the furthermost relative distance is not concealed to display character information of the object 301 with the nearest relative distance therefrom. That is, the electronic device may include and display information of a text type, called that a name of the object 301 with the nearest relative distance is "A", in a stored image, such that all the objects 301 to 306 are not concealed.

Figure 4A:
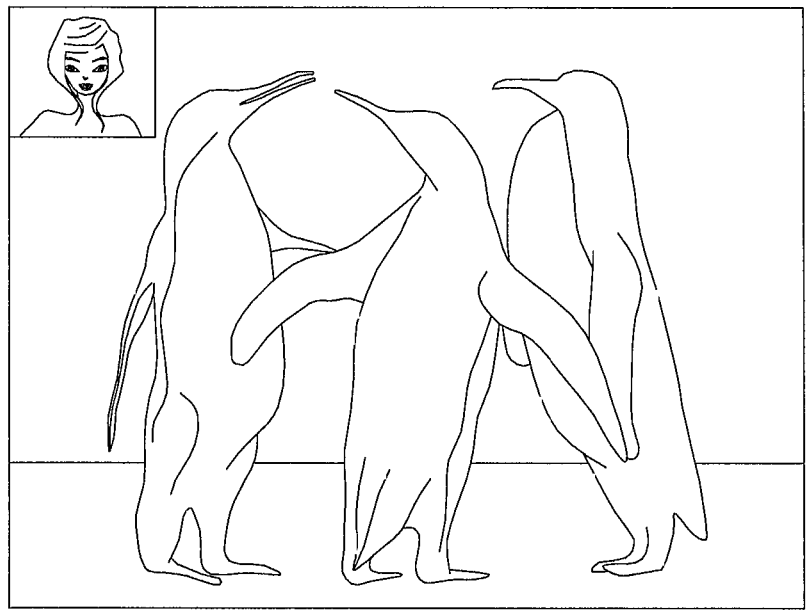
FIGS. 4A and 4B illustrate a process of displaying information including contents using edge distribution information included in object analysis information in an electronic device according to one embodiment of the present disclosure.
Figure 4B:
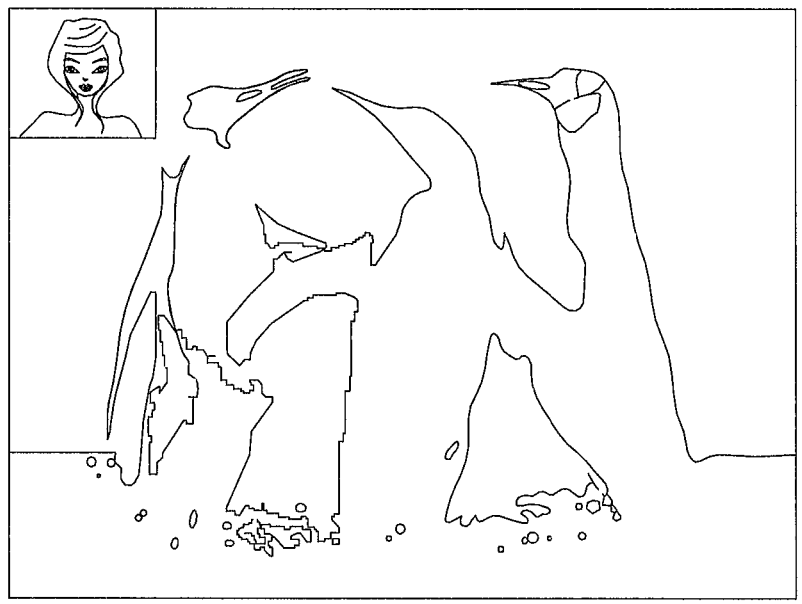

FIGS. 4A and 4B illustrate a process of displaying information including contents using edge distribution information included in object analysis information in an electronic device according to one embodiment of the present disclosure.

Hereinafter, as shown in FIG. 4A, it is assumed that the electronic device inserts an image including a face of a person into an image stored therein. Also, it is assumed that the electronic device extracts relative distance information of objects using a top phase difference sensor to be independent of object analysis information. That is, the electronic device according to one embodiment of the present disclosure ascertains object analysis information additionally to extract more accurate information to be independent of extracting the relative distance information of the objects using the top phase difference sensor.

First of all, the electronic device may extract edge distribution information, as object analysis information, of penguins which are objects to insert an image including a face of a person into an image stored therein. For example, as shown in FIG. 4B, the electronic device may display only boundary lines of penguins which are images stored therein to be independent of other information and extract edge distribution information of the penguins which are the objects.

That is, as shown in FIG. 4B, the electronic device may extract relative distance information of penguins and a background object and simultaneously extract edge distribution information of the objects.

Thereafter, the electronic device may insert and display information including certain contents into the stored image, using the extracted edge distribution information of the objects together with the extracted relative distance information of the objects. In more detail, the electronic device may insert and display image information of a person into an object with the furthermost extracted relative distance of the objects and a position with a least amount of the extracted edge distribution information.

For example, as shown in FIG. 4B, the electronic device may insert and display contents which are an image of a person into a left upper region and a right upper region which is a background object region with the furthermost relative distance of the objects in consideration of an amount of the extracted edge distribution information. That is, the electronic device may display information to be inserted on a left upper region or a right upper region which is a background object region with a least amount of edge distribution information.

Figure 5A:
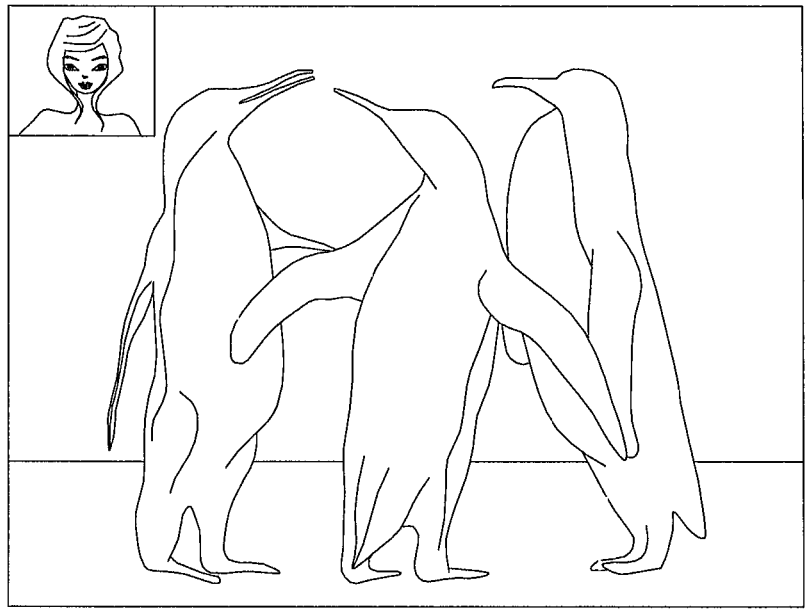
FIGS. 5A and 5B illustrate a process of displaying information including contents using contrast distribution information included in object analysis information in an electronic device according to one embodiment of the present disclosure.
Figure 5B:
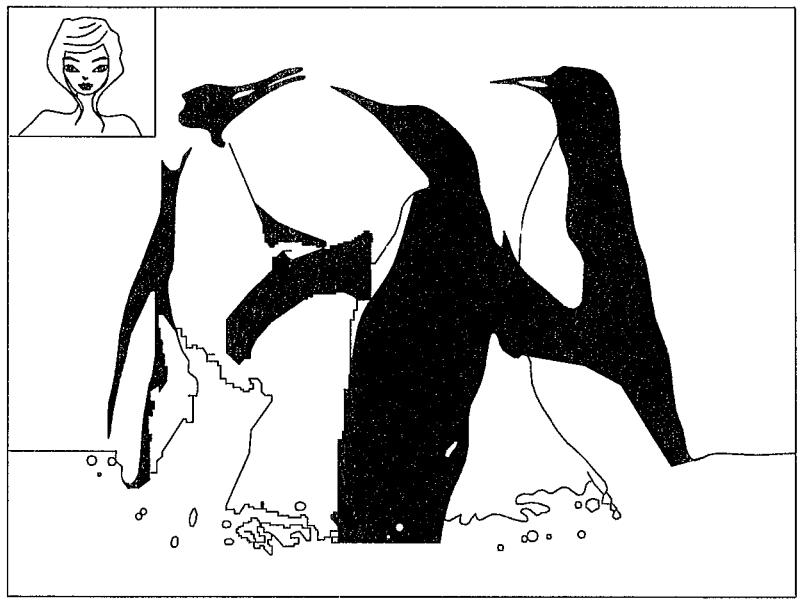

FIGS. 5A and 5B illustrate a process of displaying information including contents using contrast distribution information included in object analysis information in an electronic device according to one embodiment of the present disclosure.

Hereinafter, as shown in FIG. 5A, it is assumed that the electronic device inserts an image including a face of a person into an image stored therein. Also, it is assumed that the electronic device extracts relative distance information of objects using a top phase difference sensor to be independent of object analysis information. That is, the electronic device according to one embodiment of the present disclosure ascertains object analysis information additionally to extract more accurate information to be independent of extracting the relative distance information of the objects using the top phase difference sensor.

First of all, the electronic device may extract contrast distribution information, as object analysis information, of penguins which are objects to insert an image including a face of a person into an image stored therein. For example, as shown in FIG. 5B, the electronic device may display only contrast of penguins, which are images stored therein to be independent of other information and extract contrast distribution information of the penguins which are the objects.

That is, as shown in FIG. 5B, the electronic device may extract relative distance information of penguins and a background object and simultaneously extract contrast distribution information of the objects to extract more accurate information.

Thereafter, the electronic device may insert and display information including certain contents into the stored image, using the extracted contrast distribution information of the objects together with the extracted relative distance information of the objects. In more detail, the electronic device may insert and display image information of a person into an object with the furthermost extracted relative distance of the objects and a position with a least amount of the extracted contrast distribution information.

For example, as shown in FIG. 5B, the electronic device may insert and display contents which are an image of a person into a left upper region and a right upper region which is a background object region with the furthermost relative distance of the objects in consideration of an amount of the extracted contrast distribution information. That is, the electronic device may display information to be inserted on a left upper region or a right upper region which is a background object region with a least amount of contrast distribution information.

Figure 6:
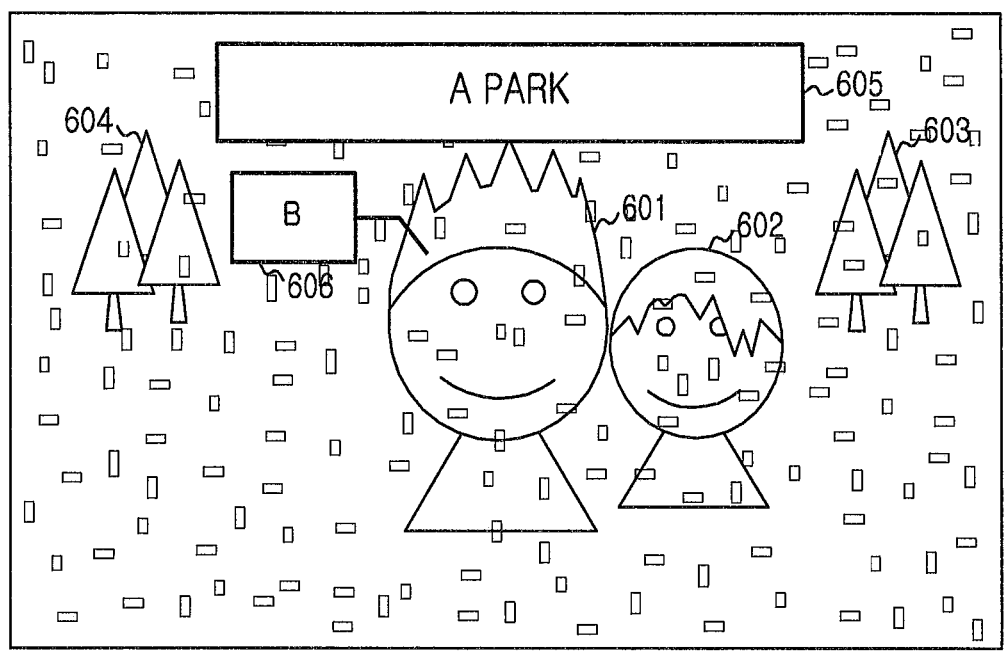
FIG. 6 illustrates a process of displaying information including contents using text distribution information included in object analysis information in an electronic device according to one embodiment of the present disclosure.

FIG. 6 illustrates a process of displaying information including contents using text distribution information included in object analysis information in an electronic device according to one embodiment of the present disclosure.

Hereinafter, it is assumed that the electronic device extract text distribution information included in object analysis information additionally to extract more accurate information to be independent of extracting relative distance information of a plurality of objects 601 to 605. Also, as a result of extracting the relative distance information of the plurality of objects 601 to 605, the object 601 of an image of a person is recognized as an object which is in the nearest position therefrom and the object 604 of a tree in the background is recognized as an object which is in the furthermost position. Also, it is assumed that text called "A park" is included among objects stored in the electronic device.

In the above-described assumption, the electronic device may extract relative distances of objects which are positioned therefrom and simultaneously extract text distribution information included in an image. In more detail, the electronic device may extract text distribution information by recognizing text distributed on an image stored therein using an optical character recognition function. That is, the electronic device may verify that the text called "A park" is distributed on a central upper side of the image using the optical character recognition function.

Thereafter, the electronic device may display certain information together on a position with a least amount of text distribution information on a background object with the furthermost extracted relative distance. For example, as shown in FIG. 6, the electronic device may insert and display information 606 indicating character information of the object 601 which is in the nearest position not to overlap the plurality of objects 601 to 604 with the object 605 including the text.

Figure 7:
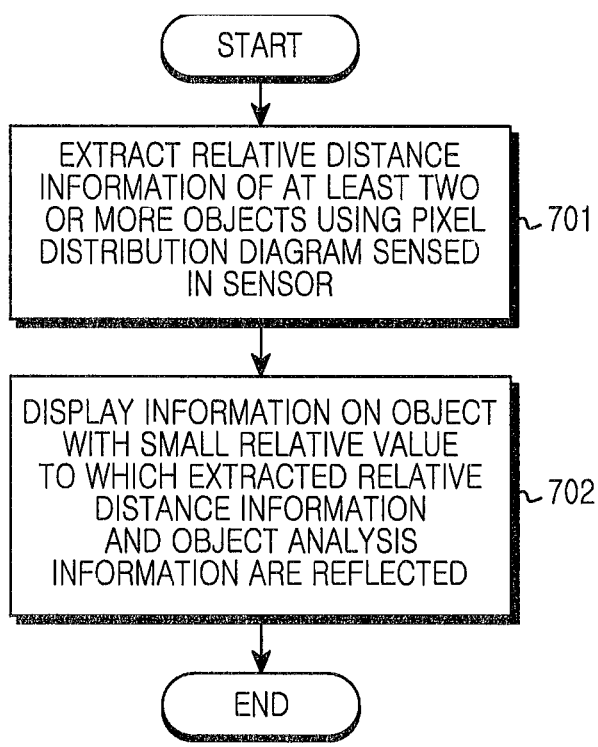
FIG. 7 is a flowchart illustrating a process of extracting a distance of an object and displaying information in an electronic device according to one embodiment of the present disclosure.

FIG. 7 is a flowchart illustrating a process of extracting a distance of an object and displaying information in an electronic device according to one embodiment of the present disclosure.

First of all, as shown in FIG. 7, the electronic device may extract relative distance information of at least two or more objects using a pixel distribution diagram sensed in the electronic device's sensor (step 701). In more detail, the electronic device may accurately extract relative distance information of a plurality of objects which are positioned therefrom, using plural pairs of phase difference focus detection pixels. That is, the electronic device may extract relative distance information according to whether another object is positioned in front of an object or in back of the object based on a currently focused object, using a top phase difference sensor.

Thereafter, the electronic device may display information on an object with a small relative value to which the extracted relative distance information and object analysis information are reflected (step 702). In more detail, the electronic device may classify at least two or more objects according to a relative value using the extracted relative distance information and the object analysis information, detect an object with the smallest relative value among at least the two or more objects classified according to the relative value, and display information on a specific region of the detected object with the smallest relative value.

Figure 8:
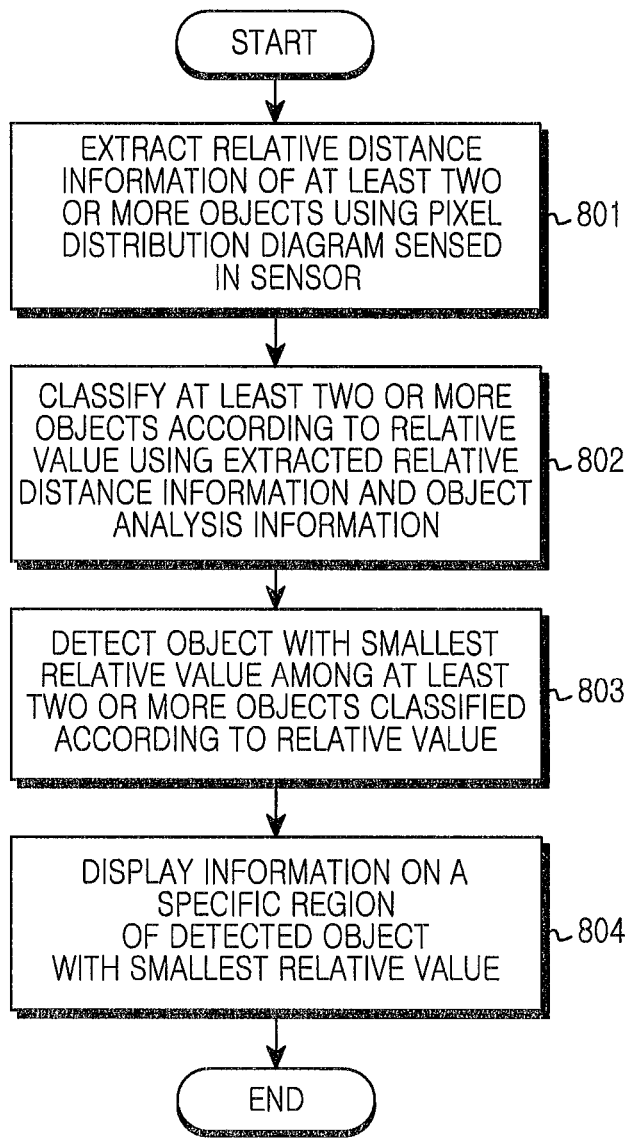
FIG. 8 is a flowchart illustrating an operation process of an electronic device according to one embodiment of the present disclosure.

FIG. 8 is a flowchart illustrating an operation process of an electronic device according to one embodiment of the present disclosure.

First of all, as shown in FIG. 8, the electronic device may extract relative distance information of at least two or more objects using a pixel distribution diagram sensed in the electronic device's sensor (step 801). In more detail, the electronic device may accurately extract relative distance information of a plurality of objects which are positioned therefrom, using plural pairs of phase difference focus detection pixels. That is, the electronic device may extract relative distance information according to whether another object is positioned in front of an object or in back of the object based on a currently focused object, using a top phase difference sensor.

Thereafter, the electronic device may classify at least the two or more objects according to a relative value using the extracted relative distance information and object analysis information (step 802). In more detail, the electronic device may classify at least the two or more objects from an object with the nearest relative distance to an object with the furthermost relative distance according to the extracted relative distance information and classify at least the two or more objects from an object with a most amount of analysis information of the object to an object with a least amount of analysis information of the object.

The electronic device may detect an object with the smallest relative value among at least the two or more objects classified according to the relative value (step 803). In more detail, the electronic device may detect an object with the furthermost relative distance information and a least amount of analysis information of the object to insert and display information including certain contents into an image stored therein.

Thereafter, the electronic device may display information on a specific region of the detected object with the smallest relative value (step 804). Accordingly, the electronic device according to one embodiment of the present disclosure may recognize objects with a distant relative distance as well as an object a near relative distance therefrom, and preferably insert and display information including certain contents such that all objects are not concealed.

Figure 9:
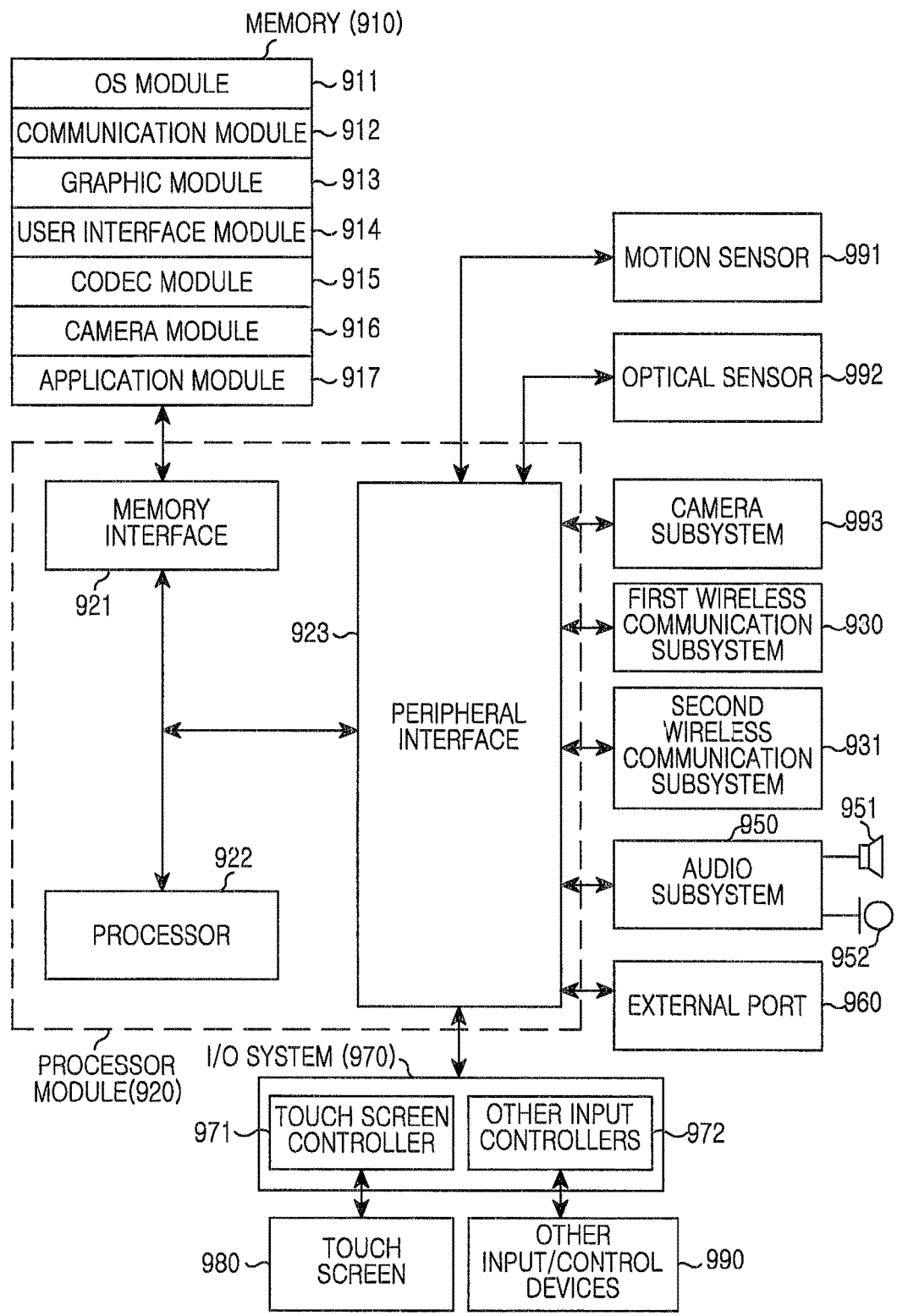
FIG. 9 is a block diagram illustrating configuration of an electronic device according to one embodiment of the present disclosure.

FIG. 9 is a block diagram illustrating configuration of an electronic device according to one embodiment of the present disclosure.

This electronic device may be a portable electronic device. The electronic device may be any one of apparatuses such as a portable terminal, a mobile phone, a mobile pad, a media player, a tablet computer, a handheld computer, and a Personal Digital Assistant (PDA). Also, the electronic device may be a certain portable electronic device including a device in which two or more functions are combined among these apparatuses.

This electronic device includes a memory 910, a processor module 920, a first wireless communication subsystem 930, a second wireless communication subsystem 931, an external port 960, an audio subsystem 950, a speaker 951, a microphone 952, an Input/Output (I/O) system 970, a touch screen 980, other input/control devices 990, a motion sensor 991, an optical sensor 992, and a camera subsystem 993. The memory 910 and the external port 960 may be a plurality of memories and external ports, respectively.

The processor module 920 may include a memory interface 921, one or more processors 922, and a peripheral interface 923. In some cases, the whole processor module 920 is referred to as a processor. In accordance with one embodiment of the present disclosure, the processor module 920 may extract relative distance information of at least two or more objects using a pixel distribution diagram sensed in a sensor of the electronic device. Also, the processor module 920 may extract relative distance information of each of at least two or more objects using a pixel distribution diagram sensed in at least a pair of phase difference focus detection pixels included in the sensor. Also, the processor module 920 may classify at least two or more objects according to a relative value using extracted relative distance information and object analysis information and detect an object with the smallest relative value among at least the two or more objects classified according to the relative value.

The processor 922 executes several software programs and performs several functions for the electronic device. Also, the processor 922 performs process and control for voice communication and data communication. Also, in addition to this normal function, the processor 922 plays a role in executing a specific software module (instruction set)

stored in the memory 910 and performing several specific functions corresponding to the software module. That is, the processor 922 interworks with the software modules stored in the memory 910 and performs the method according to one embodiment of the present disclosure.

The processor 922 may include one or more data processors, an image processor, or a codec. The processor 922 may separately include the data processors, the image processor, or the codec. Also, the processor 922 may include several processors for performing different functions. The peripheral interface 923 connects the I/O system 970 of the electronic device and several peripheral devices to the processor 922 and the memory 910 (though the memory interface 921).

A variety of components of the electronic device may be coupled by one or more communication buses (not written in reference numbers) or stream lines (not written in reference numbers).

The external port 960 is used to connect a portable electronic device (not shown) to another electronic device directly or connect the portable electronic device to another electronic device indirectly through a network (e.g., the Internet, an intranet, a wireless Local Area Network (LAN), etc.). For example, the external port 960 means, which is not limited to, a Universal Serial Bus (USB) port, a firewire port, etc.

The motion sensor 991 and the optical sensor 992 may connect to the peripheral interface 923 and perform several functions. For example, the motion sensor 991 and the optical sensor 992 may connect to the peripheral interface 923, sense motion of the electronic device, and sense light from the outside. Furthermore, a position measurement system and other sensors such as a temperature sensor, a bio-sensor, etc. may connect to the peripheral interface 923 and perform related functions.

The camera subsystem 993 may perform a camera function like a photo and video clip recording function.

The optical sensor 992 may be a Charge Coupled Device (CCD) or a Complementary Metal-Oxide Semiconductor (CMOS) device.

A communication function is performed through the first and second wireless communication subsystems 930 and 931. Each of the first and second wireless communication subsystems 930 and 931 may include a radio frequency receiver and transceiver and/or a beam (e.g., infrared ray) receiver and transceiver. The first communication subsystem 930 and the second communication subsystem 931 may be classified according to a communication network through which the electronic device communicates. For example, the communication network may be, but is not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax network, or/and a Bluetooth network. Each of the first and second communication subsystems 930 and 931 may include a communication subsystem designed to be operated through the communication network. The first and second wireless communication subsystems 930 and 931 may be combined and configured as one wireless communication subsystem.

The audio subsystem 950 may connect to the speaker 951 and the microphone 952 and may be responsible for inputting and outputting an audio stream, such as a voice recognition function, a voice copy function, a digital recording function, and a phone call function. That is, the audio subsystem 950 communicates with a user through the speaker 951 and the microphone 952. The audio subsystem 950 receives a data stream through the peripheral interface 923 of the processor module 920 and converts the received data stream into an electric stream. The converted electric stream is transmitted to the speaker 951. The speaker 951 converts the electric stream into a sound wave to which people may listen and outputs the converted sound wave. The microphone 952 converts a sound wave transmitted from people or other sound sources into an electric stream. The audio subsystem 950 receives the converted electric stream from the microphone 952. The audio subsystem 950 converts the received electric stream into an audio data stream and transmits the converted audio data stream to the peripheral interface 923. The audio subsystem 950 may include an attachable and detachable earphone, headphone, or headset.

The I/O system 970 may include a touch screen controller 971 and/or other input controllers 972. The touch screen controller 971 may be coupled to the touch screen 980. The touch screen 980 and the touch screen controller 971 may detect, but is not limited to, contact and motion or stop of them using not only capacitive, resistive, infrared ray, and surface acoustic wave technologies for determining one or more contact points with the touch screen 980 but also a certain multi-touch sensing technology including other proximity sensor arrangement or other elements. The other input controllers 972 may be coupled to the other input/control devices 990. The other input/control devices 990 may be pointer devices such as one or more buttons, a rocket switch, a thumb-wheel, a dial, a stick, and/or a stylus.

The touch screen 980 provides an input/output interface between the electronic device and the user. That is, the touch screen 980 transmits touch input of the user to the electronic device. Also, the touch screen 980 is a medium for displaying output from the electronic device to the user. That is, the touch screen 980 displays visual output to the user. This visual output has a text type, a graphic type, a video type, and a combined type of them.

The touch screen 980 may be at least one of several displays. For example, the touch screen 980 may be, but is not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED). The touch screen 980 according to one embodiment of the present disclosure may display information on an object with a small relative value to which extracted relative distance information and object analysis information are reflected. Also, the touch screen 980 may display information on an object with a distant relative distance using extracted relative distance information. Also, the touch screen 980 may display information on a portion with a little amount of information analyzed using object analysis information. Also, the touch screen 980 may display information on a specific region of an object with the detected smallest relative value.

The memory 910 may be coupled to the memory interface 921. The memory 910 may include a high-speed Random Access Memory (RAM) such as one or more magnetic storages, a non-volatile memory, one or more optical storages, and/or a flash memory (e.g., a NAND flash memory or a NOR flash memory).

The memory 910 stores software components. The software components include an Operating System (OS) module 911, a communication module 912, a graphic module 913, a user interface module 914, a CODEC module 915, a camera module 916, one or more application modules 917, etc. Also, the modules which are the software components may be expressed in a set of instructions. Accordingly, the modules are expressed in an instruction set. Also, the modules are expressed in programs.

The OS module 911 (e.g., embedded OS such as Windows, Linux, Darwin, RTXC, UNIX, OS X, or VxWorks) includes several software components for controlling a general system operation. For example, control of this general system operation means memory management and control, storage hardware (device) control and management, power control and management, etc. This OS module 911 also performs a function for smoothly communicating between several hardware components (devices) and software components (modules).

The communication module 912 may communicate with other electronic devices such as a computer, a server, and/or a portable terminal through the first and second wireless communication subsystems 930 and 931 or the external port 960.

The graphic module 913 includes several software components for providing and displaying graphics on the touch screen 980. The term "graphics" means that texts, web pages, icons, digital images, videos, animations, etc. are included.

The user interface module 914 includes several software components related to a user interface. The user interface module 914 includes contents about whether a state of a user interface is changed to any state, whether a state of a user interface is changed in any condition, etc.

The CODEC module 915 may include software components related to encoding and decoding of video files. The CODEC module 915 may include a video stream module such as an MPEG module and/or an H204 module. Also, the CODEC module 915 may include a CODEC module for several audio files such as AAA files, AMR files, and WMA files. Also, the CODEC module 915 includes an instruction set corresponding to one embodiment of the present disclosure.

The camera module 916 includes cameral-related software components capable of performing camera-related processes and functions.

The application module 917 includes a browser function, an email function, an instant message function, a word processing function, a keyboard emulation function, an address book function, a touch list function, a widget function, a Digital Right Management (DRM) function, a voice recognition function, a voice copy function, a position determining function, a location based service function, etc.

A variety of functions of the electronic device 800, which are described above or to be described later, may be executed by one or more streaming processing, hardware including an Application Specific Integrated Circuit (ASIC), software, and/or combination of them.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method of operating an electronic device, the method comprising:
executing a camera application installed in the electronic device;
while the camera application is executed, extracting relative distance information for each of at least two external objects using distributed pixels on a sensor of the electronic device, wherein the relative distance information for each of the at least two external objects indicates relative information by distances between each of the at least two external objects and the electronic device;
displaying, in a display of the electronic device, an image including at least two objects corresponding to the at least two external objects, the image photographed by the executed camera application;
determining a relative value for each of the displayed at least two objects based on the extracted relative distance information and object analysis information, wherein the object analysis information includes contrast distribution information for each of the displayed at least two objects;
determining an object with a smallest relative value among the at least two objects classified according to the relative values; and
inserting and displaying, in a specific region of the displayed image in which the object with the smallest relative value is included, one or more contents with which picture in picture (PIP) functionalities are performed.

2. The method of claim 1, wherein the sensor is a top phase difference sensor.

3. The method of claim 1, wherein extracting the relative distance information for each of the at least two external objects using distributed pixels on the sensor comprises extracting the relative distance information of each of the at least two external objects using at least a pair of phase difference focus detection pixels included in the sensor.

4. The method of claim 1, wherein displaying of the one or more contents in the specific region comprises displaying the one or more contents in the specific region including an object with a longest relative distance among the at least two objects,
wherein the relative value is inversely proportional to a relative distance.

5. The method of claim 1, wherein the specific region is a region of the object with the smallest relative value that is not to be overlapped with a region of another object.

6. The method of claim 1, wherein the inserting and displaying comprises performing the PIP functionalities by editing the displayed image with the one or more contents.

7. The method of claim 6, wherein the one or more contents include at least one of a text string, a video or another image.

8. The method of claim 7, wherein the one or more contents include content representing one object among the at least two objects.

9. The method of claim 6, wherein the editing comprises displaying, overlapping with the displayed image, in the specific region of the displayed image, the one or more contents with which the PIP functionalities are performed.

10. An electronic device comprising:
a sensor;
a processor configured to:
execute a camera application installed in the electronic device;
while the camera application is executed, extract relative distance information for each of at least two external objects of using distributed pixels on the sensor, wherein the relative distance information for each of the at least two external objects indicates relative information by distances between each of the at least two external objects and the electronic device;

display, in a display of the electronic device, an image including at least two objects corresponding to the at least two external objects, the image photographed by the executed camera application;

determine a relative value respectively for each of the displayed at least two objects based on the extracted relative distance information and object analysis information, wherein the object analysis information includes contrast distribution information for each of the displayed at least two objects; and determine an object with a smallest relative value among the at least two objects classified according to the relative values; and a touch screen configured to insert and display, in a specific region of the displayed image in which the object with the smallest relative value is included, one or more contents, with which picture in picture (PIP) functionalities are performed.

11. The electronic device of claim 10, wherein the sensor is a top phase difference sensor.

12. The electronic device of claim 10, wherein the processor is configured to extract the relative distance information for each of the at least two external objects using at least a pair of phase difference focus detection pixels included in the sensor.

13. The electronic device of claim 10, wherein the touch screen is configured to display the one or more contents in the specific region including an object with a longest relative distance among the at least two objects, wherein the relative value is inversely proportional to a relative distance.

14. The electronic device of claim 10, wherein the specific region is a region of the object with the smallest relative value that is not to be overlapped with a region of another object.

15. The electronic device of claim 10, wherein the touch screen is configured to perform the PIP functionalities by editing the displayed image with the one or more contents.

16. The electronic device of claim 15, wherein the one or more contents include at least one of a text string, a video or another image.

17. The electronic device of claim 16, wherein the one or more contents include content representing one object among the at least two objects.

18. The electronic device of claim 15, wherein the touch screen is configured to edit the displayed image by displaying, overlapping with the displayed image, in the specific region of the displayed image, the one or more contents with which the PIP functionalities are performed.

* * * * *